United States Patent
Rendina

[11] Patent Number: 6,143,359
[45] Date of Patent: Nov. 7, 2000

[54] SOLUBLE METAL HYDRIDE/TRANSITION METAL DICHALCOGENIDE ALLOYS

[75] Inventor: David Deck Rendina, Vancouver, Canada

[73] Assignee: LightYear Technologies (USA), Inc., Bellingham, Wash.

[21] Appl. No.: 09/060,189

[22] Filed: Apr. 14, 1998

[51] Int. Cl.[7] .................................................. B05D 7/00
[52] U.S. Cl. ........................ 427/215; 427/216; 427/217
[58] Field of Search ................................. 427/215, 216, 427/217

[56] References Cited

U.S. PATENT DOCUMENTS

| | | | |
|---|---|---|---|
| 4,551,400 | 11/1985 | Sapru et al. | 429/94 |
| 4,554,152 | 11/1985 | Bogdanovic | 423/647 |
| 4,623,597 | 11/1986 | Sapru et al. | 429/101 |
| 4,637,976 | 1/1987 | Terao et al. | 430/523 |
| 4,798,718 | 1/1989 | Bogdanovic | 423/647 |
| 4,822,590 | 4/1989 | Morrison et al. | 423/561.1 |
| 4,847,174 | 7/1989 | Palmer et al. | 429/112 |
| 4,853,359 | 8/1989 | Morrison et al. | 502/220 |
| 4,893,756 | 1/1990 | Fetcenko et al. | 241/33 |
| 4,996,108 | 2/1991 | Divigalpitiya et al. | 428/411.1 |
| 5,091,536 | 2/1992 | Bogdanovic et al. | 546/112 |
| 5,141,676 | 8/1992 | Bogdanovi et al. | 260/665 |
| 5,162,108 | 11/1992 | Bogdanovic | 423/647 |
| 5,199,972 | 4/1993 | Bogdanovic | 75/255 |
| 5,273,686 | 12/1993 | Bogdanovic et al. | 260/655 |
| 5,277,999 | 1/1994 | Ovshinsky et al. | 429/59 |
| 5,279,720 | 1/1994 | Divigalpitiya et al. | 204/181.5 |
| 5,284,619 | 2/1994 | Hazama | 420/455 |
| 5,358,800 | 10/1994 | Zhang et al. | 429/59 |
| 5,565,183 | 10/1996 | Knott | 423/561.1 |
| 5,670,129 | 9/1997 | Klapdor et al. | 423/645 |
| 5,730,952 | 3/1998 | Rathman et al. | 423/644 |
| 5,932,372 | 8/1999 | Rendina | 429/218.1 |

*Primary Examiner*—Shrive Beck
*Assistant Examiner*—Paul D. Strain
*Attorney, Agent, or Firm*—Antony C. Edwards

[57] ABSTRACT

A new class of metal hydride alloy and processes for forming these alloys is disclosed. The alloys are comprised essentially of organically soluble metal hydrides and single molecular layer type transition metal dichalcogenides. They are produced via a non-metallurgical route in organic solvents under mild conditions. These alloys have exhibited improved qualities in battery applications.

22 Claims, No Drawings

# SOLUBLE METAL HYDRIDE/TRANSITION METAL DICHALCOGENIDE ALLOYS

FIELD OF THE INVENTION

This invention relates to a new class of metal hydride alloys, and the methods used to produce these new materials.

PRIOR ART

Many elements, such as magnesium, lanthanum, and titanium will form occluded bonds with hydrogen under various temperature and pressure conditions. However, the kinetics of hydrogen adsorption and desorption and resistance to oxidation and corrosion of these materials are generally poor. Thus, they are usually alloyed with other materials to improve on these qualities. Metal hydride alloys are typically produced by high temperature melting under inert atmosphere blankets. The hydrogen storage capacity of the alloy is mainly determined by the strength of the Metal-Hydrogen bond, i.e. by the thermodynamic properties of the hydride. An alloy may be used as an anode in a hydride battery if the heat of formation of the hydride is in an optimal range of 8–10 kcal/mol. (M.A. Fetchenco, Electrochemical Soc. Prop. Vol 92–5, p. 141 (1992)). In addition, for hydrides having optimal compositions, the hydrogen dissociation pressure at equilibrium should be in the range of $10^{-3}$ to a few atmospheres. These conditions, among others, prohibit the use of stable hydrides in conventional batteries. They are usually overcome by adjusting the composition of an alloy, i.e. the ratio between metals forming stable hydrides (La, Zr, Ti, Mg etc.) and those forming unstable hydrides (Ni, Co, Fe, Cu etc.)

The most common alloys produced by these methods belong to two main classes;

(a) Intermetallic compounds of the $LaNi_5$ or $MmNi_5$ class. The following patents disclose material compositions and manufacturing procedures for $AB_5$ materials: U.S. Pat. Nos. #5,284,619; #5,358,800; JP Patents #6,215,766; #6,145,850; #5,358,800; #5,263,162; #5,051,695; #5,036,405; #4,253,158; #4,202,730; #3,289,042; #3,057,157; #1,253,159

(b) $AB_2$Laves phase materials based on Ti and Ni, as in: U.S. Pat. Nos. #4,551,400; #4,623,597; #4,893,756; #4,637,976; #5,277,999

Some hydrides, for example organic-solvent soluble metal hydrides, may be formed by low temperature chemical processes, such as those described in U.S. Pat. Nos. #5,091,536; #5,141,676; #5,273,686 to Bogdanovic et.al., U.S. Pat. No. #5,565,183 to Knott, and U.S. Pat. No. #5,670129 to (. Klapdor,et.al., U.S. Pat. No. #5,730,952 to Rathman, et.al., and others. I understand that these materials are most commonly employed as catalyst. In U.S. Pat. Nos. #4,554,152; #4,798,718; #5162,108 and #5,199,972 Bogdanovic, et.al., describe means whereby the kinetics of an organic-solvent soluble $MgH_2$—Mg may be modified by doping with a transition metal so that it is suitable for hydrogen storage applications. However they are still all far too reactive to be employed in conventional metal hydride batteries. Accordingly, it would be beneficial if these materials could be alloyed with materials that improve their resistance to oxidation and corrosion, and do not unduly inhibit the kinetics of hydrogen association and disassociation.

In my U.S. patent application Ser. No. #08/775,873, now U.S. Pat. No. 5,932,372 the contents of which are incorporated here by reference, I describe how a wide variety of solid particles including $AB_2$, $AB_5$, and magnesium hydrides, may be combined with homogenous suspensions of exfoliated, i.e. single molecular layer, transition metal dichalcogenides, to form unique new composite hydrides. These materials may also be further modified by various inclusions, captured within the dichalcogenide layers, and by various surface modification techniques. The composite materials produced by these techniques offer significant improvement in performance in batteries and for hydrogen storage over $AB_5$, $AB_2$ and magnesium hydrides. Although the binding process between the homogenous suspension of single molecular layer dichalcogenide and the base particle is not completely understood, there is evidence that the single molecular layer dichalcogenides particles behave in many ways like a liquid and completely conform to the irregular shape of the particles they are joined with. Thus, although I do not wish to be bound by any specific theory, I believe that the materials behave in a manner analogous to mercury, in that they can be alloyed with metal particles at room temperature.

Morrison et al in U.S. Pat. #4,822,590, describes single molecular layer transition metal dichalcogenides as novel single layer materials of the form MX(2), where MX(2) is a layer-type dichalcogenide such as MoS2, TaS2 , Ws2, or the like. These materials may be formed by exfoliation through intercalation of the dichalcogenide by an alkali metal and immersion in water.

Methods for modifying these materials by inclusions are described in U.S. Pat. No. #4,853,359 to Morrison et al and U.S. Pat. No. #4,996,108 to Divigalpitiya et al,. In these patents they describe respectively, a material of the form MS2:Y:Z wherein MS2 is a single layer transition metal dichalcogenide sulfide, Y is a promoter substance, and Z is a support substance, and a material MX(2):Y, where is MX(2) is a layer-type transition metal dichalcogenide, M is a metal selected from the group consisting of niobium, tantalum, molybdenum and tungsten, X is a chalcogen selected from the group consisting of sulfur and selenium and Y is a material located between layers of MX(2).

However, none of these teaches methods by which organic-solvent soluble, protically reactive materials, which are immiscible in water, such as organic-solvent soluble metal hydrides may be combined while in a liquid state with particles of exfoliated transition metal dichalcogenides in suspension.

Metal hydrides often react with protic solvents to form metal hydroxides. These hydroxides are detrimental to the materials performance in hydrogen storage and metal hydride battery applications. Exfoliated transition metal dichalcogenides are typically dispersed in protic solvents. If one wished to combine these materials it would be beneficial if methods could be developed to replace the protic solvent with an aprotic solvent provided that the homogenous single molecular layer nature of the dichalcogenide could be maintained in the resulting suspension.

In U.S. Pat. No. #5,279,720 Divigalpitiya et al, describes a process by which one protic solvent may be partially replaced by another protic solvent which acts as a carrier liquid for the suspended dichalcogenide. He discloses that the process is 95% effective in the replacement of water by alcohol.

However, he does not disclose methods by which a protic solvent may be replaced by a miscible aprotic solvent. The replacement of the protic solvent is crucial to the alloying of organic-solvent soluble metal hydrides with single molecular layer transition metal dichalcogenides and for the inclusion of other materials that react in a detrimental manner with protic solvents.

SUBJECT OF THE INVENTION

The present invention specifically relates to metal hydride alloys comprised of organic-solvent soluble metal hydrides produced via a non-metallurgical route in organic solvents under mild conditions, and single molecular layer-type transition metal dichalcogenides, and the processes developed to achieve the alloy.

These metal hydride alloys are of the form $MX_2Y$, wherein $MX_2$ is a single molecular layer type transition metal dichalcogenide, where M is a metal selected from the group consisting of vanadium, niobium, tantalum, molybdenum, and tungsten, X is a chalcogen selected from the group consisting of sulfur and selenium, and Y is a soluble metal hydride selected from the group consisting of organic-solvent soluble metal hydrides. These metal hydride alloys, produced by low temperature processes are suitable for applications in hydrogen storage, as solid fuels, and in electrochemical cells.

First, we will describe methods by which suspensions of exfoliated, i.e. single molecular layer, transition metal dichalcogenide dispersed in protic solvents may be re-dispersed in aprotic solvents.

In addition, we describe a low temperature method by which single molecular layer transition metal dichalcogenides may be combined with soluble metal hydrides to form the new alloys.

Finally, disclosed are new metal hydride alloys of the form $MX_2Y$. Where $MX_2$ is a transition metal dichalcogenide removed from a homogenous suspension of exfoliated transition metal dichalcogenides dispersed in an aprotic solvent, and Y is a organic-solvent soluble metal hydride.

EMBODIMENTS

The inventor has discovered that protic solvents may be displaced by miscible aprotic solvents such as, n,n, dimethylfornamide, tetrahydrofuron, or the like, by separating the majority of the protic solvent from a neutral suspension of exfoliated transition metal dichalcogenide with applied centrifugal force, decanting the liquid layer, re-dispersing the retained dichalcogenide in a miscible aprotic solvent by agitating with suitable methods such as shaking and/or stirring, and repeating until the protic solvent is completely removed.

Experiment 1

A suspension of exfoliated transition metal dichalcogenide comprised of water and single molecular layer molybdenum disulfide was prepared by known methods. The suspension was centrifuged. A paste was separated and settled to the bottom of the centrifuge tube while a liquid layer was formed above. The liquid layer was decanted. A quantity of distilled water was added to the tube and the paste was re-suspended by shaking. The material was again centrifuged and the process was repeated until the pH of the liquid layer was between 7 and 8. This water layer was decanted and replaced by a similar quantity of an aprotic solvent, in this case n,n dimethylformamide. The sample was agitated to form a homogenous dispersion. The sample was again centrifuged and the liquid level decanted and replaced with fresh n,n dimethylformamide. A sample of the homogenous dispersion was added to a material reactive with water, in this case polysulfone dissolved in n,n dimethylformamide. The process of centrifuging, decanting, replacing the decanted liquid with fresh aprotic solvent, and agitating, was repeated until no reaction occurred between the homogenous dispersion and the polysulfone.

Alternatively, if the aprotic solvent selected has a boiling point at a temperature higher than the protic solvent used as a carrier, than the suspension may be heated to remove the protic solvent.

Experiment 2

The liquid layer was decanted from a centrifuged, neutral, suspension of exfoliated transition metal dichalcogenide. The remaining paste was dispersed in a quantity of n,n, dimethylformamide. The n,n, dimethylformamide solvent was selected in this case because it has a relatively high boiling point of 135C. The homogenous dispersion was heated at a temperature above 90C and below 135C for two hours. A sample of the homogenous dispersion was added to a material reactive with water, in this case polysulfone dissolved in n,n dimethylformamide. No reaction was seen to occur.

Alternatively, the protic solvent may be replaced with a miscible aprotic solvent by adding a material dissolved within the replacement aprotic solvent, which reacts with protic solvent. The aprotic solvent selected should not react with the suspended dichalcogenide materials. It acts as a carrier for the exfoliated dichalcogenides.

Experiment 2

A sample of polysulfone crystals were dissolved in n,n, dimethylformamide. The resulting clear liquid, which had the consistency of milk, was slowly added to a neutral suspension of exfoliated $MoS_2$ in water. The polysulfone reacted with the water in the suspension forming a white polymer, which settled to the bottom of the sample container. The process was continued until no reaction was seen to occur.

The homogenous dispersions of exfoliated transition metal dichalcogenide in aprotic solvent which are produced by the methods described above may be used to create new metal hydride alloys which have exhibited superior performance in electrochemical cells.

These new metal hydride alloys have the form $MX_2Y$, wherein $MX_2$ is a single molecular layer type transition metal dichalcogenide, where M is a metal selected from the group consisting of vanadium, niobium, tantalum, molybdenum, and tungsten, X is a chalcogen selected from the group consisting of sulfur and selenium, and Y is a soluble metal hydride selected from the group consisting of organic-solvent soluble metal hydrides.

The process for creating a soluble metal hydride I exfoliated transition metal dichalcogenide alloy involves the steps of; preparing a sample of an organic-solvent soluble metal hydride in solution, adding a sufficient quantity of exfoliated transition metal dichalcogenide homogeneously dispersed in a compatible aprotic solvent to the metal hydride solution, agitating the materials to cause the hydride in solution to be coated by or included within layers of the dichalcogenide, and then recovering the precipitate which is comprised of the metal hydride/transition metal dichalcogenide alloy.

It is preferred that soluble metal hydride in solution be fully hydrided before the exfoliated dichalcogenide is added. The preferred soluble metal hydride is organic-solvent soluble magnesium hydride. The preferred exfoliated dichalcogenide is exfoliated molybdenum disulfide. It is preferred that the miscible aprotic solvent perform as a good carrier for the exfoliated metal dichalcogenide and be compatible with the soluble metal hydride i.e. that it is one within which the hydride will dissolve. In the case of exfoliated $MoS_2$ and organic-solvent soluble magnesium hydride n,n,dimethylformamide is preferred.

Experiment 3

A fully hydrided, organic-solvent soluble magnesium hydride, dissolved in solution, with a combined weight of 8.90 g was prepared by known methods. The material produced had a uniform deep red color. To this solution, a sample of exfoliated $MoS_2$ homogeneously dispersed in n,n,dimethylformamide and containing approximately 0.018 g of $MoS_2$ in suspension, was added. The mixture was shaken vigorously and rapidly separated into two layers. A yellow translucent liquid layer formed on the top, and a black solid, with a crystal-like appearance, formed on the bottom. The liquid layer contained a small quantity of excess exfoliated $MoS_2$. This liquid layer was removed by decanting and the remaining solid of the form $MX_2Y$, weighing 6.18 g was recovered.

The recovered alloy may be heated at a temperature, for a time and in an atmosphere sufficient to provide an alloy that is essentially free of organic material. For example the metal hydride alloy recovered in experiment 3 above, was heated for one hour at 160C under flowing forming gas, and an alloy substantially free of organic material was produced.

As will be apparent to those skilled in the art in light of the foregoing disclosure, many modifications and alterations are possible in the practice of this invention without departing from the spirit or scope thereof. Accordingly, the scope of the invention is to be construed in accordance with the substance defined by the following claims.

What is claimed is:

1. A method for producing a metal hydride alloy of the form $MX_2Y$ wherein $MX_2$ is comprised of single molecular layer transition metal dichalcogenide, X is a chalcogen, and Y is an organic-solvent soluble metal hydride, said method comprising the steps of:
   (a) providing a solution comprised of a soluble metal hydride and an organic solvent wherein said metal hydride is Protically reactive and immiscible in water and
   (b) providing a suspension consisting essentially of single molecular layer transition metal dichalcogenide particles homogeneously dispersed in an aprotic solvent and
   (c) combining the solution with the suspension and
   (d) recovering the precipitate, which is comprised of the soluble metal hydride/transition metal dichalcogenide alloy wherein said metal hydride has not reacted to form a metal hydroxide.

2. The method according to claim 1 further comprising the steps of selecting a metal M from the group consisting of vanadium, niobium, tantalum, molybdenum, and tungsten, selecting a chalcogen X from the group consisting of sulfur and selenium, and agitating the solution and the suspension to cause the hydride in solution to be coated by, or included within, layers of the dispersed transition metal dichalcogenide particles.

3. The method according to claim 1 wherein said single molecular layer transition metal dichalcogenide particles are exfoliated by intercalation of the dichalcogenide with an alkali metal and immersion in water.

4. The method according to claim 2 wherein said aprotic solvent is an organic solvent within which said soluble metal hydride may dissolve.

5. The method according to claim 1 wherein said aprotic solvent is miscible.

6. The method according to claim 1 further comprising the step of heating said precipitate for a time, and in an atmosphere sufficient to provide a metal hydride alloy essentially free of organic material.

7. The method according to claim 2 wherein said organic-solvent soluble metal hydride is an organic-solvent soluble magnesium hydride.

8. The method according to claim 2 wherein said organic-solvent soluble metal hydride is an organic-solvent soluble aluminum hydride.

9. The method according to claim 3 wherein said single molecular layer transition metal dichalcogenide particles are single molecular layers of molybdenum disulfide.

10. The method according to claim 3 wherein said single molecular layer transition metal dichalcogenide particles are single molecular layers of tungsten disulfide.

11. The method according to claim 4 wherein said organic solvent is selected from the group consisting of n,n, dimethylformamide, tetrahydrofuron, toluene, and ethereal solvents.

12. A method for producing a metal hydride alloy of the form $MX_2Y$ wherein $MX_2$ is comprised of single molecular layer transition metal dichalcogenide, X is a chalcogen and Y is an organic-solvent soluble metal hydride, said method comprising the steps of:
   (a) providing a solution comprised of a soluble metal hydride and an organic solvent wherein said metal hydride is protically reactive and immiscible in water,
   (b) providing a suspension comprised of single molecular layer transition metal dichalcogenide particles homogeneously dispersed in a protic solvent,
   (c) replacing said protic solvent with an aprotic solvent,
   (d) after said replacing, combining the solution with the suspension,
   (e) recovering the precipitate, which is comprised of the soluble metal hydride/transition metal dichalcogenide alloy wherein said metal hydride has not reacted to form a metal hydroxide.

13. The method according to claim 12 further comprising the steps of selecting a metal M from the group consisting of vanadium, niobium, tantalum, molybdenum, and tungsten, selecting a chalcogen X from the group consisting of sulfur and selenium, and agitating the solution and the suspension to cause the hydride in solution to be coated by, or included within, layers of the dispersed transition metal dichalcogenide particles.

14. The method according to claim 13 wherein said single molecular layer transition metal dichalcogenide particles ate exfoliated by intercalation of the dichalcogenide with an alkali metal and immersion in water.

15. The method according to claim 13 wherein said aprotic solvent is an organic solvent within which said soluble metal hydride may dissolve.

16. The method according to claim 13 wherein said aprotic solvent is miscible.

17. The method according to claim 13 wherein said organic solvent is selected from the group n,n, dimethylformamide, tetrahydrofuron, toluene, and ethereal solvents.

18. The method according to claim 13 further comprising the steps of agitating the solution and the suspension to cause the hydride in solution to be coated by, or included within, layers of the dispersed transition metal dichalcogenide particles, and beating said recovered precipitate for a time, and in an atmosphere, sufficient to provide a metal hydride alloy essentially free of organic material.

19. The method of claim 13 wherein said step of replacing said protic solvent with an aprotic solvent comprises the steps of:
(a) adjusting a pH of said suspension to a pH of between 6 and 8,
(b) applying centrifugal force to separate liquid aid the solid particles,
(c) removing the liquid,
(d) adding said aprotic solvent in the form of a miscible aprotic solvent to replace the liquid, and
(e) thereafter agitating to create a dispersion.

20. The method according to claim 19 wherein steps (b) (c) (d) and (e) are repeated.

21. The method according to claim 19 further comprising step (f) wherein said dispersion is heated at a temperature and for a time sufficient to boil away the protic solvent, but at a temperature insufficient to boil the aprotic solvent, so as lo leave a dispersion essentially free of the protic solvent.

22. The method according to claim 19 further comprising step (f) wherein a protic solvent precipitating material is added to said dispersion in a manner and in a quantity sufficient to precipitate the protic solvent contained within said dispersion.

* * * * *